United States Patent Office  3,764,431
Patented Oct. 9, 1973

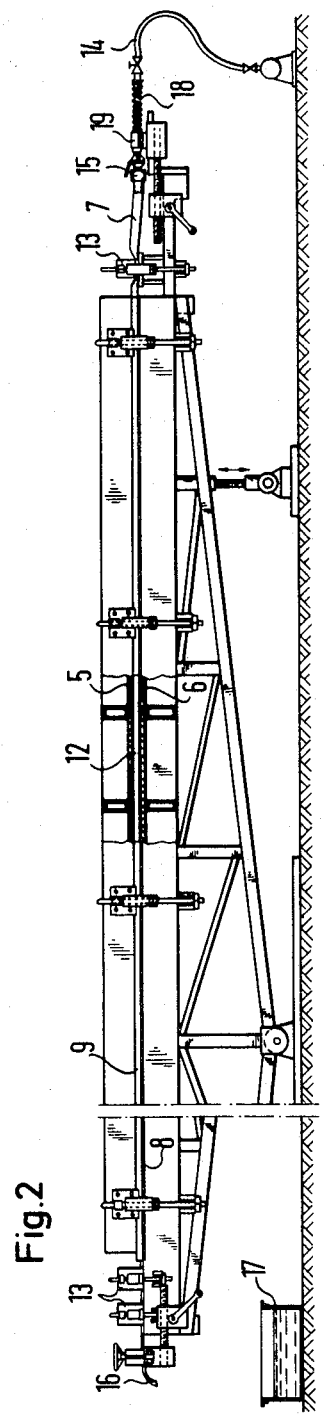

3,764,431
METHOD AND APPARATUS FOR MAKING CHANNELLED SHEETS FROM DEFORMABLE MATERIALS
Heinrich Krämer, Josef Butz, Richard Müller, Ludwig Thoma, and Johann Pöllmann, Weiden, Hans Zielbauer, Ullersricht, and Xaver Bernklau, Weiden, Germany, assignors to Flachglas AG Delog-Detag, Fuerth, Germany
Filed Oct. 22, 1970, Ser. No. 83,038
Int. Cl. B29d 23/02, 31/20
U.S. Cl. 156—156
5 Claims

ABSTRACT OF THE DISCLOSURE

A method of making channelled sheets from deformable materials includes the steps of forming a laminate of webs with expandable shaping devices between the webs, and expanding the devices to urge outer webs against smooth surfaces and to urge a middle web or webs to adopt a channel wall configuration, with the edges of at least the outer webs being restrained against movement transverse to the channels. The outer webs can be pretensioned, and the expandable shaping devices can be restrained during expansion and can also be pretensioned.

BACKGROUND OF THE INVENTION

This invention relates to a method and apparatus for producing channelled sheets.

PRIOR ART

French patent specification No. 1,475,603 discloses a method of making sheets of fiber material impregnated with synthetic resin and provided with channels, which comprises forming a laminate of three webs of fibers impregnated with synthetic resin, including expandable molding devices between the middle web and the outer webs, expanding the devices so that the outer webs are urged against molding surfaces and the middle web adopts a cross piece configuration between the outer webs, and curing the resin. The middle web then forms the walls of channels in the cured laminated sheets.

Perfect channeled sheets must, in particularl, have surfaces which are smooth and free from folds or wrinkles, and crosspieces, i.e. channel walls which are in the correct planes and are the correct distances apart. Although the quality of sheets produced by the known process is adequate, it could be improved with advantage, particularly if the sheets are to fulfill not only a technical, but also an aesthetic purpose, for example, by being used as transparent inserts for doors, where deviations from the optimum shape easily catch the eye.

It is an object of the invention to provide an improved method of making channelled sheets.

SUMMARY OF THE INVENTION

According to one aspect of the present invention there is provided a method of making a channelled sheet from deformable material(s) including the steps of forming a laminate of webs of deformable material(s), locating expandable molding devices between at least one middle web of said laminate and outer webs of said laminate, expanding said devices to urge said outer webs against molding surfaces and to urge said at least one middle web into a configuration to define walls of channels between said outer webs and restraining the edges of said outer webs against movement transverse to said channels during expansion of said shaping devices.

The expandable devices are suitably tubes within the laminates, which are expanded by inflation with a fluid.

The deformable materials may be fiber material impregnated with liquid synthetic resin. Once shaped, such sheets are cured. Generally, the channels have longitudinal axes parallel to the longest axis of the sheet. The clamping of the edges provides an all-around closed shape having a lateral boundary which prevents displacement of the expandable devices within the laminate on expansion. In addition, the clamping of the edges has the effect that when the laminate is expandaed it cannot contract transversely to the longitudinal direction of the channels, but is, on the contrary, even stretched in the opposite direction, and consequently lies more smoothly, that is to say, without the formation of folds, on the molding surfaces.

The formation of a smooth external surface can be improved by an optional feature of the invention wherein the laminate is elastically pre-tensioned transverse to the length of the intended channels before the expansion of the molding devices. To the tension which arises on expansion is then added the elastic pre-tension, which ensures that the external web lies even better on the molding surfaces, that is to say, an even smoother surface is provided.

The quality of a sheet can be impaired if the molding devices themselves form folds within the laminate. In order to avoid this, it is expedient to restraint and/or to pre-tension the expandable devices in their longitudinal direction before beginning expansion, and in fact elastic pre-tensioning and restraint is best since firm clamping can easily lead to tearing.

Whereas the two outer webs undergo no substantial extension on expansion of the expandable devices, the middle, initially flat, web is deformed into crosspieces whose total width is substantially larger than the initial width of the middle web. If this web is also clamped at its longitudinal edges, which it can be, so that it is restrained and pre-tensioned therewith, relatively large transverse forces are generated therein. If a material is used for the outer webs which is not suitable for such stretching, a different material can be used for the inner webs. Such a material might suitably be capable of being stretched a large amount in the transverse direction and only a small amount in the longitudinal direction, or the middle web may be in the form of strips. This means, however, that there is a difference in material between the two outer webs and the middle web, which although tolerable is undesirable for manufacturing reasons. To overcome this problem, the middle web can have an initial width such that it is not clamped with other webs, and can slide with respect thereto. Alternatively, two or more partially overlapping edges which are gripped with the edges of the outer webs. These middle webs slide on each other during expansion of the expandable devices. If there are two middle webs, they can each be restrained at one edge with the outer webs during expansion of the expandable devices.

The invention also provides apparatus for performing such a method, said apparatus including two spaced apart molding surfaces, means to expand the shaping devices, and clamping strips between the molding surfaces and adjacent edges thereof effective to clamp the outer webs of the laminate during expansion of the shaping devices. The clamping strips may also act as spacing strips for determining the sheet thickness.

The elastic pre-tensioning of the laminate before expansion of the expandable devices can be achieved by inserting at least one expandable tube alongside a clamping strip and expanding this tube.

Since the apparatus may provide a closed mold, the air above the initially flat laminate may not be able to leave from the side edges when the tubes are expanded. In order to avoid the counter-pressure of the air during the molding process, the molding surfaces may be provided with ventilation bores.

In a third aspect, the invention provides a channelled sheet made by the above method.

In order that the invention may be more clearly understood, the following description is given, merely by way of example, with reference to the accompanying drawings, in which:

BRIEF DESCRIPTION OF THE DRAWINGS

FIG. 2 is a schematic side view of an apparatus according to the invention.

DETAILED DESCRIPTION OF THE DRAWINGS

Figure 1:
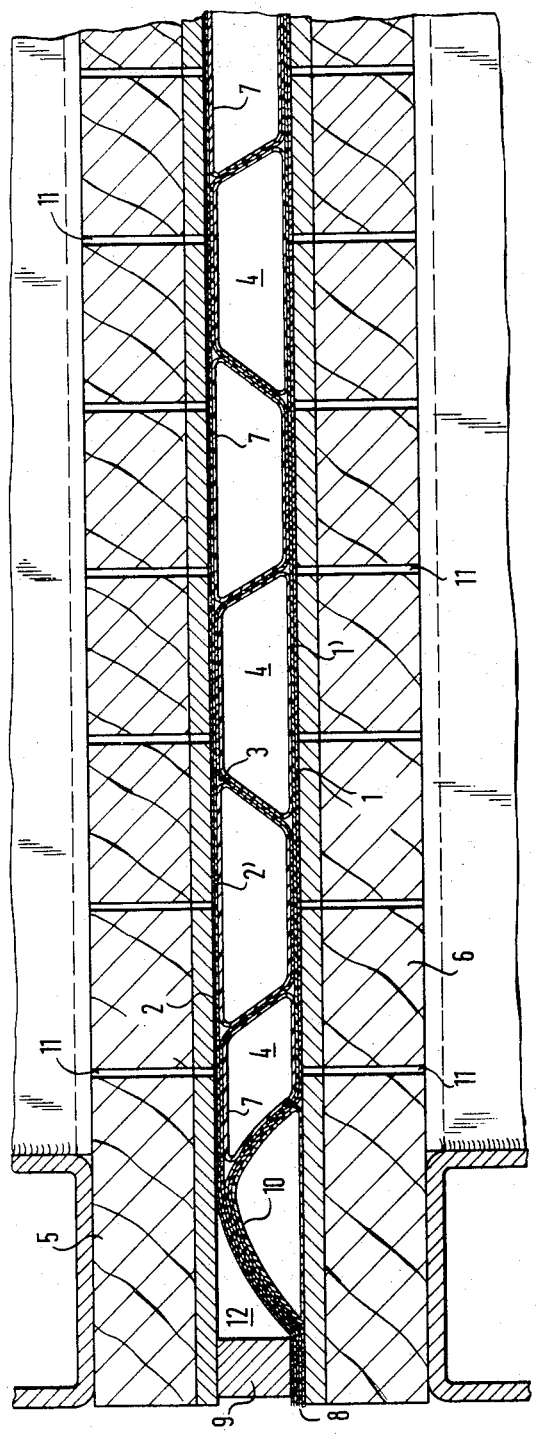
FIG. 1 is a part cross-sectional transverse view of a sheet during formation with the expandable devices expanded, and showing part of an apparatus according to the invention.

The expanded laminate shown in FIG. 1 has outer webs 1 and 2, in fact shown as double thickness webs (1, 2, 1', 2'), as there is no need to have single outer webs, a middle web 3 which has been formed into cross pieces or walls to channels 4, and expanded expandable devices 7 in the form of tubes which provide the channels 4. A longitudinal edge 8 of all webs, which is shown at the left of the figure, is clamped by a clamping strip 9. The outer webs have been urged against molding surfaces 5, 6, which are smooth and have bores 11 leading thereto.

To obtain the position shown in FIG. 1, the laminate of the webs 1, 1', 3, 2', 2, with collapsed tubes 7 included, has been located between the surfaces 5, 6 and the tubes have then been inflated, while edges 8 are clamped, to urge the outer webs against the smooth surfaces, expelling air through bores 11, and molding the middle web 3 to the desired shape. The sheet can be cured between the molding surfaces by, for instance, the application of heat, or can be sured elsewhere. Usually, the tubes 7 are then removed. The shapes of the channels 4 are determined by with the shapes of the tubes 7, the shapes shown being merely exemplary.

A further feature of the invention is shown in FIG. 1, wherein the outer webs 1, 2 have been pretensioned before the expansion of tubes 7 by inflating a tube 10 located on the surface 6 adjacent the clamping strip 9. This stretches and pretensions the clamped webs.

The clamping of the outer webs at 9, and at the corresponding (not shown) other longitudinal edge, prevents any movement of the tubes 7 during expansion. The middle web 3 can be clamped at its longitudinal edges, but this is not necessary. Pretensioning gives an even smooth surface to the outer webs.

As shown in FIG. 1, the strips 9 also serve the purpose of determining the thickness of the sheets produced, so that they act as spacing strips. Separate spacing and clamping strips could, however, be provided.

FIG. 2 shows schematically a generally longitudinal side view of one form of apparatus of the invention. A part of the figure which is a sectional view shows a space 12 within which the sheets are formed. Clamping devices 13, which may be elastic, are provided at each end to clamp the tubes 7 which pass through the sheet or laminate. The agent for inflating the tubes, for example water, oil or air, may be introduced at 14 via connecting pieces 15 and, after the shaping process is complete, may be led off via outlets 16 into a tank 17 or recycled.

The clamping devices 13 are preferably adjustable to adapt to the varying sheet lengths, or a plurality of such beams at different positions may be fitted.

For the purpose of pre-tensioning the tubes 7 in order to avoid formation of folds therewithin, the connecting pieces 15 are not fixed, but are displaceable in a holding device 19 and are spring urgable to the right by means of a spring arrangement 18. If the tubes contract as a result of the expansion, the holding devices can yield elastically without the tensioning effect of the spring arrangement 18 being lost.

When a sheet is being formed, the clamping device 13 at the left end may be used to close an end of the tubes while the clamping device 13 at the right end is not in a clamping position, fluid being introduced into the tubes. When expansion is complete, the clamping device 13 at the right end may be used to close the tubes while curing or thermosetting of the laminate takes place.

The expandable devices may, for example, be made of polyvinyl chloride, cellophane, polyethylene or the like. The deformable material may, as mentioned be a fiber reinforced resin, and may typically be of woven glass filaments in a thermosetting resin. Channelled sheets could also be made of thermoplastic materials if these were heated before expansion and allowed to cool afterwards.

Curing of a thermosetting resin containing sheet can be performed either in the mold by heating it, or outside the mold.

The method of the invention eliminates a difficulty experienced in prior known methods wherein the expendable devices tended to move relative to each other during expansion, even if their inlets and outlets were secured.

What is claimed is:

1. Apparatus for use in making a plate-like body having longitudinal channels from three webs of fibrous material impregnated with a liquid, hardenable synthetic resin, said apparatus comprising first and second, spaced apart smooth mold surfaces facing each other, a first of said webs being positioned on said first molding surface, a plurality of elongated first expandable shaped bodies positioned on the first web at equal distances apart and covering said web, a second of said webs being located on said first web at said first expandable shaped bodies, a plurality of elongated second expandable shaped bodies located at identical distances between said first expandable bodies and extending over the length of the web, the third web extending from the width of the first web to the second web and to the second expandable shaping bodies, means operably connected to said first and second expandable shaped bodies to expand said first and second shaped bodies forming channels through said second web and for pressing said first and third webs against said first and second smooth mold surfaces and clamping strips located between said first and second mold surfaces adjacent edges thereof and effective to clamp said first and third webs of the laminate consisting of said three webs during expansion of said expandable shaped bodies, pretensioning means for said first and third webs, said pretensioning means comprising at least one expandable tube disposed between said first and second mold surfaces and adjacent one of said clamping strips.

2. Apparatus for use in making a plate-like body having longitudinal channels from three webs of fiberous material impregnated with a liquid, hardenable synthetic resin, said apparatus comprising first and second, spaced apart smooth mold surfaces facing each other, a first of said webs being positioned on said first molding surface, a plurality of elongated first expandable shaped bodies positioned on the first web at equal distances apart and covering said web, a second of said webs being located on said first web at said first expandable shaped bodies, a plurality of elongated second expandable shaped bodies located at identical distances between said first expandable bodies and extending over the length of the web, the third web extending from the width of the first web to the second web and to the second expandable shaped bodies, means operably connected to said first and second expandable shaped bodies to expand said first and second shaped bodies forming channels through said second web and for pressing said first and third webs against said first and second smooth mold surfaces, clamping strips located between said first and second mold surfaces adjacent edges thereof and effective to clamp said first and third webs of the laminate consisting of said three webs during expansion of said expandable shaped bodies, and adjustable elastically mounted holding elements for said expandable shaped bodies.

3. Apparatus as claimed in claim 2 and further comprising positionally adjustable clamping devices for said expandable shaped bodies, said devices being located remote from said holding elements.

4. A method of making plate-like bodies having longitudinal channels in which three webs of a deformable material are positioned between two molding surfaces and are expanded in their longitudinal direction by expandable shaping bodies alternatively located between the center web and one outer web and the center web and the other outer web, the improvement comprising the steps of:
 (a) supplying a first plate-like web of fibrous material impregnated with a liquid, hardenable synthetic resin on a first smooth mold surface;
 (b) applying a plurality of elongated first expandable shaping bodies onto said first web at equal distances from each other and covering said web;
 (c) applying a second plate-like web of fibrous material impregnated with a liquid, hardenable synthetic resin onto said first web and said first expandable shaping form bodies;
 (d) applying a plurality of elongated second expandable shaping bodies at identical distances between said first expandable shaping bodies, with said second expandable shaping bodies extending over the length of the web;
 (e) positioning a third plate-like web of fibrous material impregnated with a liquid, hardenable synthetic resin from the width of said first web to said second web and to said second expandable shaping bodies;
 (f) positioning a second flat mold surface at a predetermined distance from said third web;
 (g) stretching the laminate consisting of said three webs along its longitudinal edges;
 (h) expanding said first and second expandable shaping bodies for forming channels through said second web and for pressing said first and third webs against said flat mold surfaces, and
 (i) gripping the laminate by expanding an elongated expandable body adjacent the longitudinal edges between steps (g) and (h).

5. A method of making plate-like bodies having longitudinal channels in which three webs of a deformable material are positioned between two molding surfaces and are expanded in their longitudinal direction by expandable shaping bodies alternately located between the center web and one outer web and the center web and the other outer web, the improvement comprising the steps of:
 (a) supplying a first plate-like web of fibrous material impregnated with a liquid, hardenable synthetic resin on a first smooth mold surface;
 (b) applying a plurality of elongated first expandable shaping bodies onto said first web at equal distances from each other and covering said web;
 (c) applying a second plate-like web of fibrous material impregnated with a liquid, hardenable synthetic resin onto said first web and said first expandable shaping form bodies;
 (d) applying a plurality of elongated second expandable shaping bodies at identical distances between said first expandable shaping bodies, with said second expandable shaping bodies extending over the length of the web;
 (e) positioning a third plate-like web of fibrous material impregnated with a liquid, hardenable synthetic resin from the width of said first web to said second web and to said second expandable shaping bodies;
 (f) positioning a second flat mold surface at a predetermined distance from said third web;
 (g) stretching the laminate consisting of said three webs along its longitudinal edges;
 (h) expanding said first and second expandable shaping bodies for forming channels through said second web and for pressing said first and third webs against said flat mold surfaces, and prestretching said first and second expandable shaping bodies in a longitudinal direction between steps (e) and (f).

References Cited
UNITED STATES PATENTS

| | | | |
|---|---|---|---|
| 3,490,973 | 1/1970 | Graff et al. | 156—210 X |
| 3,048,514 | 8/1962 | Bentele | 156—156 X |
| 1,535,354 | 4/1925 | Steele et al. | 156—292 X |
| 1,574,060 | 2/1926 | Roberts | 156—210 X |

RALPH S. KENDALL, Primary Examiner

U.S. Cl. X.R.

156—210, 292, 500